United States Patent

[11] 3,592,315

[72] Inventor Henry B. Lewis
2200 Gregory Lane, Waco, Tex. 76708
[21] Appl. No. 878,331
[22] Filed Nov. 20, 1969
[45] Patented July 13, 1971

[54] TRACTOR-TRAILER BRAKE SYSTEM
12 Claims, 1 Drawing Fig.
[52] U.S. Cl. .................................................. 192/3 TR,
188/3 R, 303/7
[51] Int. Cl. .................................................. F16d 67/00,
B60t 13/26
[50] Field of Search .................................... 192/3 TR,
1; 188/3 R; 303/7

[56] References Cited
UNITED STATES PATENTS
1,872,397  8/1932  Bragg et al. .................. 303/7
1,957,891  5/1934  Kazenmaier .................. 303/7
2,643,746  6/1953  Righter ........................ 192/3 TR
2,870,885  1/1959  McIntosh et al. ............. 192/3 TR
3,190,700  6/1965  Fites ............................ 303/7

Primary Examiner—Allan D. Herrmann
Attorneys—Giles C. Glegg, Jr. and Peter J. Murphy ABSTRACT: The brake system includes conventional air brake actuators for the tractor and trailer, controlled from a source of pressurized air in the tractor by a brake pedal actuated control valve. Reduced pressure air is directed to the trailer actuators only through an automatic system controlled by a valve coupled to the engine foot throttle linkage. This valve is normally closed, but is opened when the foot throttle is released to partially apply the trailer brakes. The system may also includes a manual control valve for applying the trailer brakes only.

PATENTED JUL 13 1971 3,592,315

INVENTOR.
HENRY B. LEWIS
BY
ATTORNEY

TRACTOR-TRAILER BRAKE SYSTEM

BACKGROUND OF THE INVENTION

This invention relates to a brake system for a tractor-trailer combination; and more particularly to a system for the automatic actuation of the trailer brakes in situations of deceleration of the tractor-trailer.

This invention is directed to the problem of "tractor jackknife" which results when the tractor swings or skids out of the normal train or alignment with the trailer. In general, the cause of "tractor jackknife" is the loss of traction of the tractor drive wheels with the road surface, accompanies by a deceleration of the tractor at a rate greater than that of the trailer. The difference in deceleration rates results in the trailer tending to overtake the tractor and producing a force or forces at the kingpin tending to swing the tractor out of alignment. Whether it is the loss of traction or the unequal deceleration condition which occurs first, these conditions together produce a situation highly conducive to a jackknife producing skid.

One common situation, which inherently produces tractor deceleration relative to the trailer, occurs when the tractor operator removes his foot from the foot throttle control for the tractor engine. Immediately a braking effect or retardation of the tractor-driving wheels occurs due to the drag of the drive train which includes the engine, the transmission, and the differential, the drive train remaining coupled to the driving axles. The trailer, of course, remains free rolling and tends to overtake the tractor applying a pushing force at the kingpin. This unbalanced deceleration condition would occur at any time that the tractor operator reacts to a situation by decreasing engine power whether or not it is his intent to brake the unit through the conventional service brake system or other braking system provided in the unit. The force at the kingpin due to unbalanced deceleration may start a skid to produce an accompanying loss of traction.

Another situation which may produce unequal deceleration of the tractor and trailer is an unbalance of the conventional service brake system. Because of the distance between the tractor brake actuators and the trailer brake actuators, the tractor brakes would normally be actuated ahead of the trailer brakes due to the additional time necessary to pressurize the lines to the trailer actuators. To prevent this sequence of brake operation, conventional service brake systems are normally designed and balanced so that the trailer brakes are actuated slightly ahead of the tractor brakes. So long as the system is properly balanced and adjusted, the undesirable relative deceleration of tractor and trailer should not occur upon application of the service brakes. However, because of the frequent interchange of tractors and trailers to make up combination units, it is not uncommon that the systems are unbalanced such that the tractor brakes are set first producing the undesirable overtaking force on the kingpin.

There are other conditions which may contribute to a tractor jackknife. When the road surface is rough or irregular, resultant sidewise forces acting on the kingpin may contribute to the loss of traction and encourage a skid. Of course, if the road surface is wet or slippery, the opportunity for loss of traction is greatly increased. Also, if the trailer is either unloaded or lightly loaded, traction is more difficult to maintain.

A number of systems have been devised and employed in an effort to eliminate some of the conditions contributing to this hazard. Such methods and systems include air modulating valves, pressure limiting valves, clutch and linkage mechanisms to hold the kingpin assembly, and electronic dump valves. Many of these systems are quite complicated and expensive and some are relatively ineffective to accomplish the desired result.

An object of this invention is to provide a system for maintaining equalization of forces at the tractor-trailer kingpin in deceleration situations.

Another object of this invention is to provide an improved tractor-trailer brake system including means for automatically applying the trailer brakes in deceleration situations.

Another object of this invention is to provide such an improved tractor-trailer brake system which is relatively simple and inexpensive and which is effective in operation.

A further object of this invention is to provide such an improved tractor-trailer brake system which is adapted to be readily installed in existing equipment through relatively simple modifications of the existing braking system.

A still further object of this invention is to provide such an improved braking system which compliments the conventional braking system and which does not change the operation of the conventional braking system.

These objects are accomplished in a superatmospheric braking system which includes a pressurized air source in the tractor, a first brake pedal actuated control valve in the tractor for controlling the flow of air to the brake actuators for both the tractor and trailer. A second control valve for controlling the flow of air to the trailer actuators only, is actuated by the engine foot throttle control in a manner to direct air to actuate the trailer brakes when the foot throttle is released, and to release the brakes when the foot throttle is actuated to increase engine power.

DRAWING

The novel features of the invention, as well as additional objects and advantages thereof, will be understood more fully from the following description when read in connection with the accompanying drawing which is a diagrammatic illustration of a tractor-trailer brake system embodying the present invention.

DESCRIPTION OF THE PREFERRED EMBODIMENT

Figure 1:
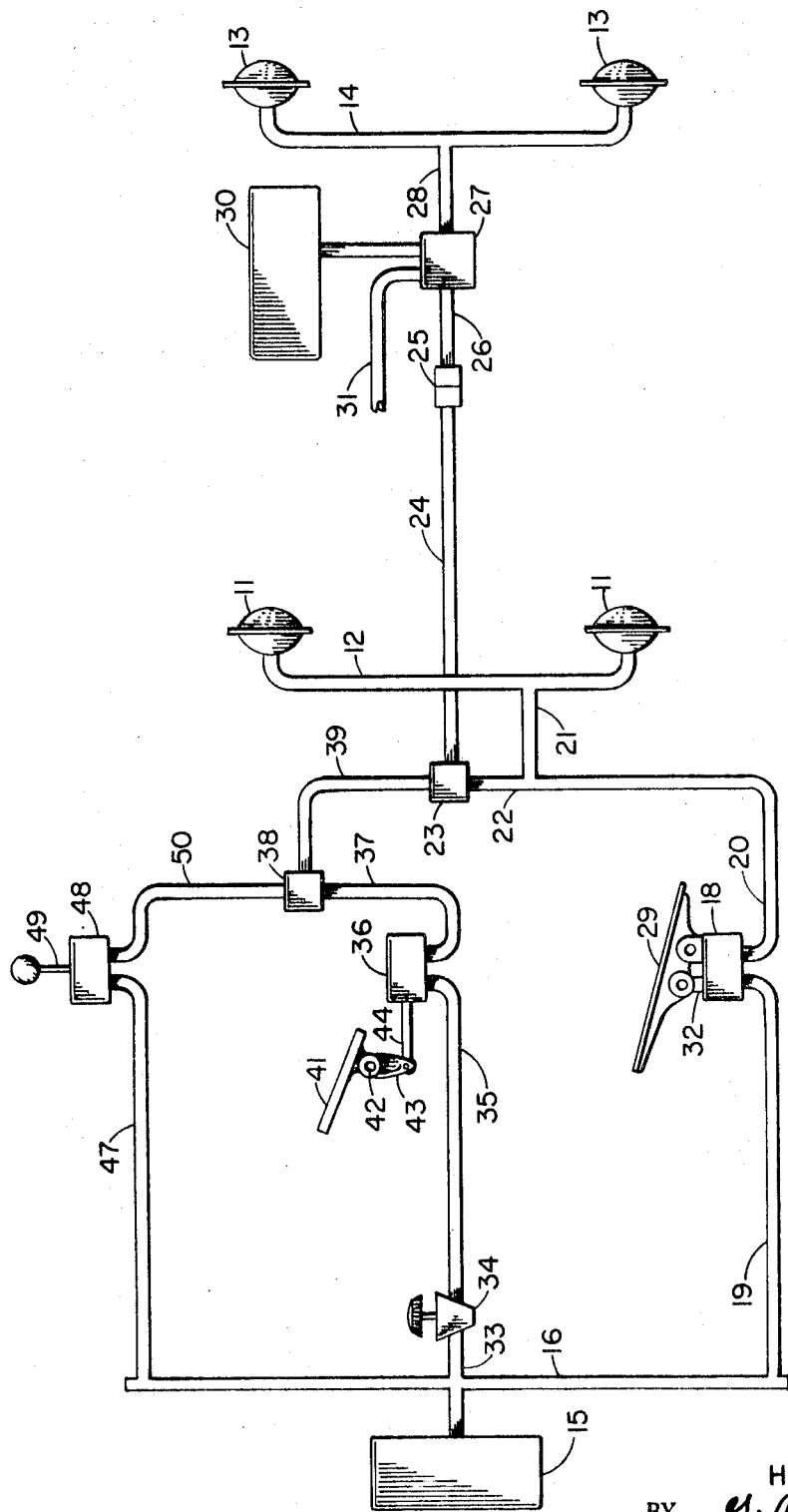

Referring to the drawing, the brakes for the tractor are represented by actuators 11, connected by a conduit 12; and the brakes for the trailer are represented by actuators 13, connected by a conduit 14. These actuators are actuated by compressed air from a source represented by a reservoir or receiver 15, normally mounted on the tractor, and supplied by a suitable air compressor which is not shown.

The service braking system which is conventional, consists of a control valve 18 for controlling the flow of pressurized air to the actuators 11 and 13 under the control of the tractor operator. A conduit 19 communicates a reservoir supply manifold 16 and the control valve 18; and the conduits 20 and 21 direct air from the control valve to the conduit 12 for the tractor actuators 11. Air from the control valve 18 to the conduit 14 for the trailer actuators 13 is directed through conduit 22, a double-acting check valve 23, conduit 24, coupler 25, conduit 26, conventional emergency relay valve 27, and conduit 28. An emergency reservoir 30 associated with the emergency relay valve 27 is supplied with air through emergency line 31 which is connected to the tractor air supply through a coupler and conduit system which are not shown.

The coupler 25 represents the air line connection between the tractor and the trailer. Preferably this coupler is such as to open communication between the conduits 24 and 26 when the coupler is engaged, and to close conduit 24 when the coupler is disconnected.

The control valve 18 is normally urged to a closed condition wherein no air flows to the brake actuators. The valve is controlled by the tractor operator through the service brake pedal 29 pivotally mounted on the housing of valve 18 and coupled to valve actuator plunger 32. The valve 18 preferably provides for increasing braking force in response to the amount of pedal depression. It will be seen then that actuation of the service brake pedal 29 by the operator directs air to the brake actuators 11 and 13 to operate the tractor and trailer brakes substantially simultaneously.

The service brake system conventionally includes means for setting the trailer brakes slightly ahead of the tractor brakes;

and this sequence of brake operation will occur if the system is properly balanced. Because of the interchange of tractor and trailer equipment, it is not uncommon that the system is unbalanced such that the tractor brakes are set first.

A system for directing pressurized air to the trailer brakes only, which is also conventional, is a manually controlled system commonly referred to as a "trailer brake system." This system includes a conduit 47 connected to the manifold 16, a control valve 48 having a control handle 49 for manual operation, by the operator, conduit 50, a double-acting check valve 38, conduit 39, and the portion of the above described service brake system including the two-way check valve 23, conduits 24, 26, 28 and 14, coupler 25 and relay valve 27. This trailer brake system would normally be used when the operator desires to apply the trailer brakes independently of the tractor brakes; and this is done by manual operation of the control valve 48 through the handle 49. Preferably, the valve 48 provides for a variable control of the braking force applied to the trailer brakes in response to the movement of the control handle by the operator.

When this trailer brake system is in use, the double-acting check valve 38 will shift to effect the flow of pressurized air from the conduit 50 into the conduit 39; and similarly, the double-acting check valve 23 will shift to effect the flow of air from the conduit 39 into the conduit 24. Should the service brake control valve 18 be opened while the trailer brake control valve 48 is open, or should the two valves be opened simultaneously, the double-acting check valve 23 will respond to the pressure differential in the conduits 22 and 39 and direct the higher pressure air into the conduit 24.

A system for automatically directing pressurized air to the trailer actuators only, which is the principle feature of the present invention, includes conduit 33 connected to the manifold 16, pressure regulator 34, conduit 35, control valve 36, conduit 37, double-acting check valve 38, conduit 39, and the portion of the first described service brake system including a two way check valve 23, conduits 24, 26, 28 and 14, coupler 25 and relay valve 27. The control valve 36 is preferably an on-off valve or a two way valve providing either flow or no-flow through the system.

The pressure regulator 34 is adjustable to provide the desired pressure of air supplied to the actuators 13 through this automatic control system. As will be explained in connection with the operation of the overall system, it is desirable to only partially apply the trailer brakes through this automatic system; and it is not desirable that the trailer brakes be permitted to lock up through this system. The control valve 36 is controlled by the foot actuated engine throttle control, indicated by an accelerator pedal or foot throttle 41; the pedal 41, in the diagrammatic illustration, being pivoted at 42 and including an arm 43 hingedly connected to a valve actuator rod 44. The foot throttle 41 is normally urged to the engine idle position; and in this position, the control valve 36 is opened to direct pressurized air to the trailer brake actuators 13 only. When the foot throttle 41 is depressed to increase engine power, the valve 36 is closed to release the trailer brakes.

This automatic control system is connected in parallel with the manual trailer brake system through the two-way check valve 38. Should the control valves of both systems be opened simultaneously, the double-acting check valve 38 would respond to the pressure differential in the conduits 37 and 50 and shift to effect the flow of the higher pressure air into the conduit 39. If the manual trailer brake system were not provided, the double-acting check valve 38 would not be required, and the conduits 37 and 39 would be directly connected.

The automatic control system is also connected in parallel with the service brake system through the double-acting check valve 23. When the trailer brakes are applied through the automatic system, the check valve 23 will shift to effect the flow of air from the conduit 39 into the conduit 24. When the service brakes are applied, the higher pressure air of the primary system will shift the valve 23 to effect the flow of air from the conduit 22 into the conduit 24.

The operation of the overall system is believed apparent from the foregoing description; however, a brief summary of the operation follows. In a decelerating or braking situation, the first reaction of the operator is to release the accelerator pedal 41 and then, if necessary, operate the service or trailer brakes. When the accelerator pedal is released, pressurized air is immediately directed to the trailer brake actuators 13 only. The pressure of the air applied through this automatic system is predetermined through the adjustment of the pressure regulator 34; and this adjustment taking into consideration the load condition and the road conditions. For example, with a heavy trailer load, it may be desirable to provide greater braking force than that desired for a lighter load. If the road conditions are either wet or slippery, it may be desirable to make a compensating adjustment. Generally, it will be desirable that the pressure applied through this automatic system should not be sufficient to apply the trailer brakes to a locked up condition, since a particular purpose of this system is to either neutralize or compensate for the braking effect applied to the tractor drive wheels because of drive train drag. It is desirable that the braking force applied to the trailer wheels through this automatic control system should be at least as great as that applied to the tractor drive wheels through the drive train drag to maintain alignment and compensate for the force at the kingpin developed by drive train drag.

Even assuming an emergency or hard braking situation, the trailer brakes will have been partially applied by the automatic system at the time the service brakes are actuated through the brake pedal 29. In this situation, should the tractor brakes tend to set up first because of an unbalanced service system, the prior partial braking of the trailer already effected will tend to reduce the opportunity for a jackknife producing skid. Additionally, since the conduits 24, 26, 28 and 14 have already been partially pressurized through the automatic control system, the delay time between actuation of the tractor brakes and the trailer brakes, through service brake unbalance, should be reduced to further lessen the opportunity for a jackknife producing skid.

With the trailer brake system manual control valve 48, the operator has additional opportunity for control of the trailer brakes independently of or ahead of the tractor brakes. Again, in a braking situation, the first reaction is to release the accelerator pedal 41. With the automatic system, this, of course, will immediately effect partial actuation of the trailer brakes to compensate for engine drag. The operator may desire further trailer braking before applying the tractor brakes; and, for this purpose, he may use the manual control valve 48 which will direct air at pressures controlled by this control valve up to full reservoir pressure. If the pressurized air directed through the control valve 48 exceeds the pressure applied through the accelerator actuated valve 36 of the automatic system, the double-acting check valve 38 will shift to permit the higher pressure air to flow to the trailer brake actuators 13. Should the tractor-trailer brakes subsequently be applied through the service brake system control valve 18, the double-acting check valve 23 will adjust to supply to the brake actuators 13 with the higher pressure air from either the control valve 18 or the control valve 48.

A particular advantage of the above-described system is that the trailer brakes are partially actuated, automatically, in deceleration or braking situations to at least compensate for the braking effect applied to the tractor drive wheels by drive train drag. This automatically obviates the condition which contributes frequently to a jackknife producing skid; and this automatic control is independent of the reaction time of the operator since the reaction producing the engine drag is the same reaction which produces the partial trailer braking.

An additional advantage of this system applies in an emergency or hard braking situation. In any braking situation, it is likely that the operator reaction will cause him to release the accelerator pedal 41 prior to application of the brakes either through the service brake pedal 29 or through the trailer brake manual control lever 49. The releasing of the accelerator automatically partially pressurizes the conduits 24, 26, 28 and 14 in connection with the partial application of the trailer brakes. Now when the trailer brakes are further applied through the trailer brake valve 48, for example, they will be applied faster as a result of the prepressurization of these conduits. Similarly, should the trailer brakes be applied through the service brake pedal control valve 18, the trailer brakes would be applied earlier relative to the application of the tractor brakes because of this partial prepressurization. In other words, any delay time between the service brake controlled actuation of the tractor brakes and trailer brakes is reduced to further lessen the opportunity for a jackknife producing skid.

What I claim is:

1. In a tractor-trailer brake system including a source of pressurized air; brake actuators for the tractor wheel brakes; brake actuators for the trailer wheel brakes; first conduit means communicating said source with said tractor and trailer actuators; a foot actuated control valve for controlling the flow of air through said first conduit means to said tractor and said trailer actuators to actuate the brakes; and a foot actuated throttle control for the tractor engine;

second conduit means communicating said source with said trailer brake actuators; a second control valve for controlling the flow of air through the second conduit means; means coupling said second control valve to said throttle control to effect the closing of said control valve when said throttle control is actuated to open the engine throttle, and to effect the opening of said control valve when the throttle control is released to the engine idle position.

2. A system as set forth in claim 1 including check valve means in said first conduit means for preventing the flow of air from said second control valve to said tractor brake actuators.

3. A system as set forth in claim 1 including regulating means in said second conduit means for controlling the pressure of air flowing therethrough to said trailer brake actuators.

4. A system as set forth in claim 1 including third conduit means communicating said source with said trailer brake actuators; a manually operable control valve for controlling the flow of air through said third conduit means.

5. A system as set forth in claim 3 wherein said second control valve is an on-off valve open only in the engine idle position of the foot throttle control.

6. In a tractor-trailer brake system including brake actuators for the tractor wheel brakes, brake actuators for the trailer wheel brakes, a source of pressurized air associated with the tractor, and conduit means communicating said source with said tractor wheel brake actuators and with said trailer wheel brake actuators;

a control system comprising a control valve and associated conduit means for directing pressurized air from said source to said trailer brake actuators only; said control valve being responsive to the throttle control for the tractor engine, whereby said control valve is opened in the idle condition of said throttle control and whereby said control valve is closed in other conditions of said throttle control.

7. A tractor-trailer brake system as set forth n claim 6 including adjustable pressure regulator means in said control system conduit means for setting the pressure of air supplied to said trailer brake actuators through said control valve.

8. A tractor-trailer brake system as set forth in claim 6 including a second control system comprising a second control valve and associated conduit means for directing pressurized air to said tractor actuators and said trailer actuators; and check valve means in said second system for preventing the flow of air from said first named control valve to said tractor brake actuators.

9. A tractor-trailer brake system as set forth in claim 7 wherein said first named and second control systems include common conduit means for directing air to said trailer brake actuators; and double-acting check valve means connected to said common conduit means providing alternative flow of air to said trailer brake actuators from one or the other of said first named and second control valves.

10. A tractor-trailer brake system as yet forth in claim 8 a third control system comprising a third manually operable control valve and associated conduit means for directing air to said trailer brake actuators only.

11. A tractor-trailer brake system as set forth in claim 10 wherein said first named second and third control systems each communicate with said trailer brake actuators through a common conduit means; and check valve means associated with the conduit means for effecting the flow of air from only one of said control valves to said trailer brake actuators, and for preventing reverse flow from an one control valve to the other of said control valves.

12. A tractor-trailer brake system as set forth in claim 10 including check valve means associated with said second control system for preventing actuation of said tractor brake actuators by said first named or third control valves.